(12) United States Patent
Brown et al.

(10) Patent No.: US 6,505,310 B1
(45) Date of Patent: Jan. 7, 2003

(54) CONNECTION INTEGRITY MONITOR FOR DIGITAL SELECTION CIRCUITS

(75) Inventors: Matthew Brown, Kanata (CA); Ross Caird, Ottawa (CA); Joleen Hind, Ottawa (CA); Jean Guy Chauvin, Navan (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/397,968

(22) Filed: Sep. 17, 1999

(51) Int. Cl.[7] ................................................ H02H 3/05
(52) U.S. Cl. ........................ 714/43; 714/735; 714/824
(58) Field of Search ......................... 714/43, 715, 716, 714/735, 820, 821, 824; 379/22.01, 249; 370/249

(56) References Cited

U.S. PATENT DOCUMENTS

| | | | | |
|---|---|---|---|---|
| 3,994,975 A | * | 11/1976 | Oude Alink et al. ........ 252/390 |
| 4,155,071 A | * | 5/1979 | Shamburger ............. 340/146.2 |
| 4,328,584 A | * | 5/1982 | Samuelsson et al. ....... 714/821 |
| 4,561,094 A | * | 12/1985 | Jackowski et al. .......... 714/735 |
| 4,581,577 A | | 4/1986 | Nowosad et al. ............. 324/66 |
| 4,750,181 A | * | 6/1988 | McDonald et al. .......... 714/735 |
| 4,783,785 A | | 11/1988 | Hanata ......................... 371/25 |
| 4,837,488 A | | 6/1989 | Donahue ...................... 324/66 |
| 5,095,418 A | * | 3/1992 | Arita et al. .................. 376/215 |
| 5,241,550 A | * | 8/1993 | Kusano ....................... 370/357 |
| 5,272,705 A | * | 12/1993 | Okamoto .................... 370/249 |
| 5,592,496 A | * | 1/1997 | Shimizu et al. .......... 324/158.1 |
| 5,625,292 A | | 4/1997 | Crook et al. ................. 324/538 |
| 5,995,587 A | * | 11/1999 | Lee ............................. 379/1.03 |
| 6,005,695 A | | 12/1999 | Roberts ....................... 359/110 |
| 6,341,358 B1 | * | 1/2002 | Bagg et al. ................. 324/539 |

FOREIGN PATENT DOCUMENTS

| | | |
|---|---|---|
| EP | 0235907 | 9/1987 |
| GB | 2183114 | 5/1987 |
| GB | 2278689 | 7/1994 |

* cited by examiner

*Primary Examiner*—Robert Beausoleil
*Assistant Examiner*—Yolanda L. Wilson

(57) ABSTRACT

A circuit connection integrity monitor detecting and isolating connection faults in data path cards is disclosed. A connection integrity monitoring method and corresponding apparatus are applicable to selector and cross-connect circuits and permit a user to monitor all points where signal traffic may be prone to misconnection.

19 Claims, 6 Drawing Sheets

CONNECTION INTEGRITY MONITOR FOR DIGITAL SELECTION CIRCUITS

FIELD OF THE INVENTION

The present invention relates to a connection integrity monitor and, more particularly, to a method and apparatus for ensuring that connection faults in data paths are detected.

BACKGROUND OF THE INVENTION

Monitoring of connection integrity at the device level is usually unnecessary. In telecommunication protocols such as SONET, for example, information is imbedded in a data stream indicating its source. Generally speaking, telecom networks are homogeneous and by monitoring the imbedded information, misconnection errors are readily identifiable. However, in systems where source information is unavailable, or difficult to monitor, another means of ensuring integrity is required.

As is known, in some applications it is necessary to select an output from several inputs. A device to perform this function where there is only one output may be referred to as a multiplexer or selector. It several outputs may be selected uniquely from the inputs, the device may be referred to as a crosspoint switch or a cross-connect. In these applications, it is often necessary to detect when a fault has occurred. A fault mode, wherein the output is connected to an input different than the programmed input, may be especially difficult to detect if the input signals are similar.

A data path often includes selectors and cross-connects so that connections can be configured electronically. Should these devices fail such that an incorrect input is connected to a given output, the fault would often be undetected. In some applications, it is not possible to extract information from the payload to determine if the correct payload is being carried. It is therefore necessary to ensure that any point where a misconnection may occur is monitored to detect such a failure.

As a consequence of not detecting a connection fault, the wrong traffic may be connected on the output to downstream equipment. Further, the traffic cannot be guaranteed, nor can the fault be isolated when detected by some means external to the transmission system.

SUMMARY OF THE INVENTION

The present invention provides a method and apparatus for ensuring that connection failures occurring in a data path will be detected. This allows the fault to be isolated, protected and alarmed, thus avoiding improper traffic routing and facilitating subsequent repair.

In accordance with one aspect of the present invention, there is provided a method of determining connection fault of an output signal in a data path selector circuit. The method includes providing a selector circuit having a plurality of data inputs, providing a second circuit, independent of the selector circuit, for comparing at least one output of the selector circuit with an expected input, comparing, with the independent circuit, the output with the expected input to determine whether the output is in accordance with the expected input and detecting, if present, a connection fault.

In another aspect of tho invention a connection integrity monitor is provided for carrying out this method.

In accordance with another aspect of the present invention, there is provided a method of determining connection fault of an output signal in a data path cross-connect circuit. The method includes providing a cross-connect circuit having a plurality of data inputs, providing a second circuit, independent of the cross-connect circuit, for comparing at least one output of the cross-connect circuit with an expected input, comparing, with the independent circuit, the output with the expected input to determine whether the output is in accordance with the expected input and detecting, if present, a connection fault. In another aspect of the invention a connection integrity monitor is provided for caring out this method.

In accordance with a further aspect of the present invention, there is provided a method of checking integrity of a connection control path connected to a primary connection map of a primary circuit and to a secondary connection map of an integrity monitor, including maintaining activity on one of a plurality of data inputs to the primary circuit and the integrity monitor with an input signal which is unique as compared with other possible signals on the plurality of data inputs. The method further includes, where the connection integrity monitor indicates a no fault connection for a given output of the primary circuit based on a comparison between a data signal on the given output and a corresponding data signal generated by the connection integrity monitor, where a connection origin for the given output is one of the plurality of data inputs, and where a connection origin for the corresponding data signal is one of the plurality of data inputs, writing a new connection origin for the given output to the primary connection map. The method also includes checking for an indication by the connection integrity monitor of a faulty connection for the given output and if the checking step fails to indicate a faulty connection, indicating a potential connection control address bus failure.

In accordance with another aspect of the present invention, there is provided a method of checking for a connection fault in a switched data path connection circuit including providing a fault indicating output path corresponding with each output data path of the switched data path connection circuit and a fault indicating input path corresponding with each input data path of the switched data path connection circuit The method further includes receiving connection control signals for the switched data path connection circuit, receiving an input data signal at each fault indicating input path corresponding with each data path input of the switched data path connection circuit and utilising the connection control signals, each the input data signal and each output data signal on each output data path to check for a connection fault.

In accordance with another aspect of the present invention, there is provided a method of checking for a connection fault in a switched data path connection circuit, including providing a fault indicating output path corresponding with each output data path of the switched data path connection circuit and a fault indicating input path corresponding with each input data path of the switched data path connection circuit. Further, the method includes receiving connection control signals for the switched data path connection circuit, receiving an input data signal at each fault indicating input path corresponding with each data path input of the switched data path connection circuit and mapping the received data signal on the corresponding fault indicating input path to one the fault indicating output path based on the connection control signals. To conclude, the method includes comparing a signal on the one fault indicating output path with a signal on a corresponding output path of the switched data path connection circuit to check for a connection fault.

In accordance with another aspect of the present invention, there is provided a method of checking for a connection fault in a switched data path connection circuit, including providing a fault indicating output path corresponding with each output data path of the switched data path connection circuit and a fault indicating input path corresponding with each input data path of the switched data path connection circuit. The method further includes receiving connection control signals for the switched data path connection circuit and receiving an input data signal at each fault indicating input path corresponding with each data path input of the switched data path connection circuit. The method also includes, for each output data path of the switched data path connection circuit, comparing a signal on each output data path to each input data signal and connecting a connection fault indicating signal resulting from the comparing step to one the fault indicating output path based on the connection control signals.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Having generally described the invention, reference will now be made to the accompanying drawings illustrating the preferred embodiments and in which.

Similar numerals employed in the text denote similar elements.

DETAILED DESCRIPTION OF THE PREFERRED EMBODIMENTS

Figure 1:
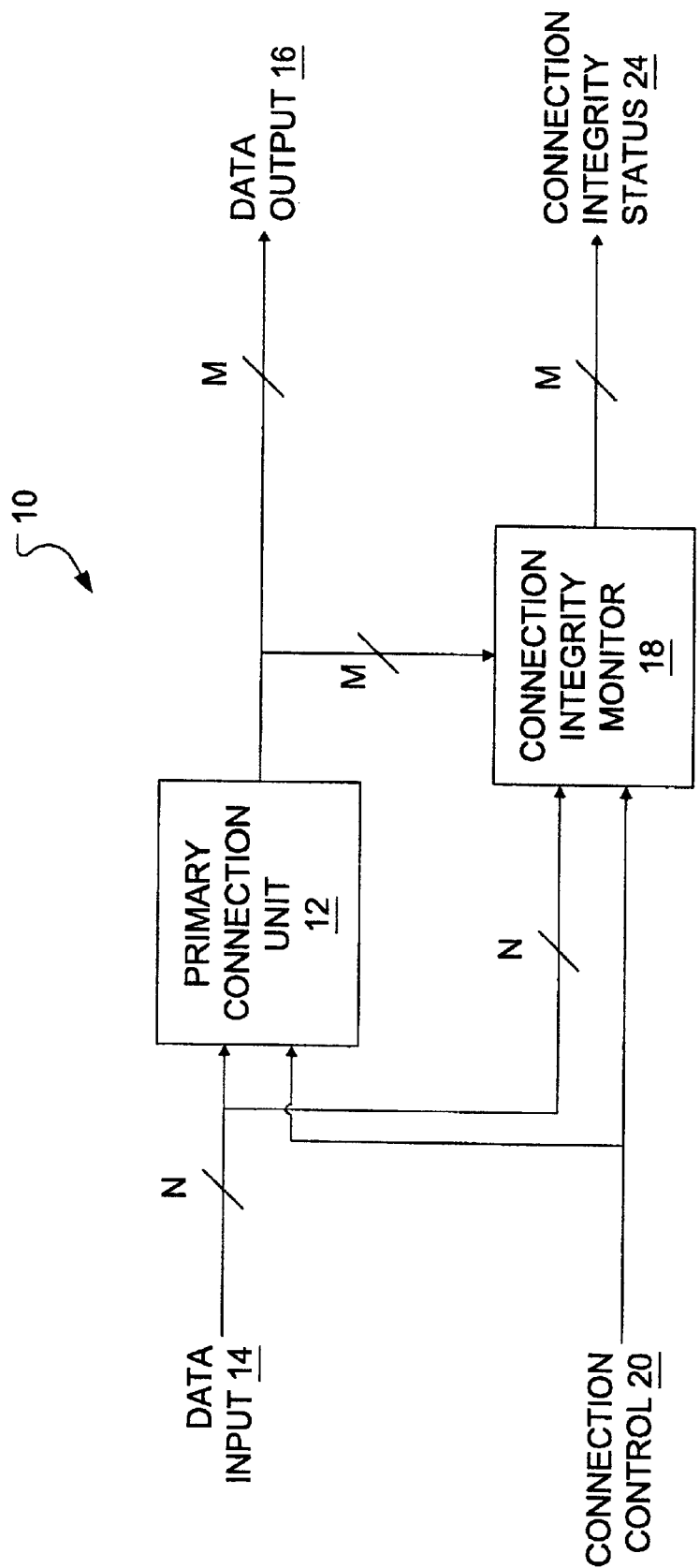
FIG. 1 is a schematic illustration of the connection integrity monitor circuit according to one embodiment of the invention.

Referring now to the drawings, FIG. 1 illustrates a switched circuit 10 wherein a primary connection unit 12 connects one of N input paths 14 to each of M output paths 16 according to input on a connection control path 20. If M is equal to one then the connection circuit is equivalent to a N:1 multiplexer or selector. A connection integrity monitor 18 also receives input connection control on path 20 along with data input on paths 14 and the data output on paths 16 from primary connection unit 12. The output of the connection integrity monitor (CIM) is an indication, on each of M connection integrity status lines 24, of agreement between data on output paths 16 and data on corresponding input paths 14.

Figure 2:
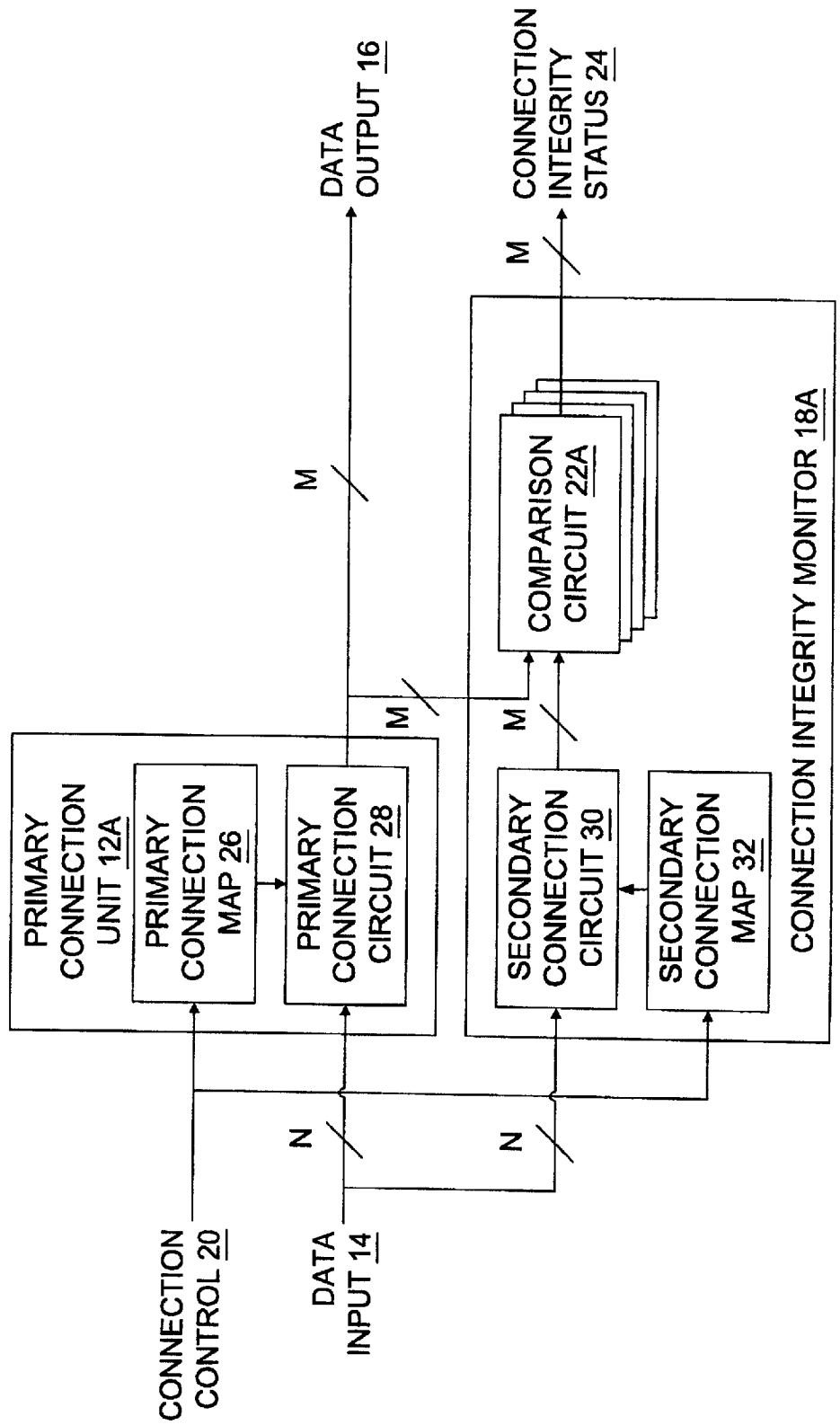
FIG. 2 is a similar view to FIG. 1 illustrating the circuit for higher level architecture.

Referring now to FIG. 2, one embodiment for the CIM and the primary connection unit are detailed. In this embodiment, primary connection unit 12A is illustrated as comprising a primary connection map 26 that receives connection control signals on path 20 and passes output to a primary connection circuit 28 that also receives data from data input paths 14. Correspondingly, CIM 18A comprises a secondary connection map 32 that receives connection control signals on path 20 and passes output to a secondary connection circuit 30 that also receives data from input paths 14. Data on output paths 16 of primary connection circuit 28 is passed to a comparison circuit 22A of CIM 18A along with data from the output of secondary circuit 30. The output of comparison circuit 22A are indications on connection integrity status lines 24.

Secondary connection map 32 is, more generically, a comparison map which tells CIM 18A which of N input paths 14 to connect with a particular one of M output paths. Primary connection map 26 provides the same function for primary connection unit 12A.

Secondary connection map 32 of CIM 18A is programmed with connection control data on path 20 in a similar manner to primary connection map 26 of primary connection unit 12A (such that, absent faults, the maps should contain the same information), but the map circuitry is independent. It may be observed that for each of the output paths 16 of connection unit 12A an input path is selected with a redundant connection unit comprising secondary connection circuit 30 and secondary connection map 32. Data on each of the primary connection circuit output paths 16 and data output from secondary connection circuit 30 are compared at comparison circuit 22A. If the signals differ for one of the M output paths 16, then a failure indicator is made active on a corresponding one of M connection integrity status lines 24.

In greater detail, secondary connection circuit 30 selects one of the data input paths 14 to compare with one of the data output paths 16 of primary connection unit 12A. Advantageously, when secondary connection circuit 30 has the same circuit type as primary connection circuit 28, matching of the signal delay between the signals entering comparison circuit 22A is facilitated. Secondary connection circuit 30 co-operates with a secondary connection map 32, which contains the connection information to select the data from the correct input path for comparison to the data from primary connection circuit output path Secondary connection map 32 is completely independent of primary connection map 26 to prevent the same fault from occurring in connection integrity monitor 18A as in primary connection unit 12A.

It will be appreciated by those skilled in the art that to program connection information in connection maps 26 and 32 it is necessary to indicate a memory address or location and provide connection data. These services may be provided through separate buses, one for the provision of an address, called an "address bus," and one for the provision of the connection data, called a "data bus." These busses form part of connection control path 20 which may also include a bus used for reading back the connection data written to a particular address. Connection control path 20 may be divided into two paths, one for the primary map and one for the secondary map. For efficiency, however, the paths may be fully or partially shared.

Figure 4:
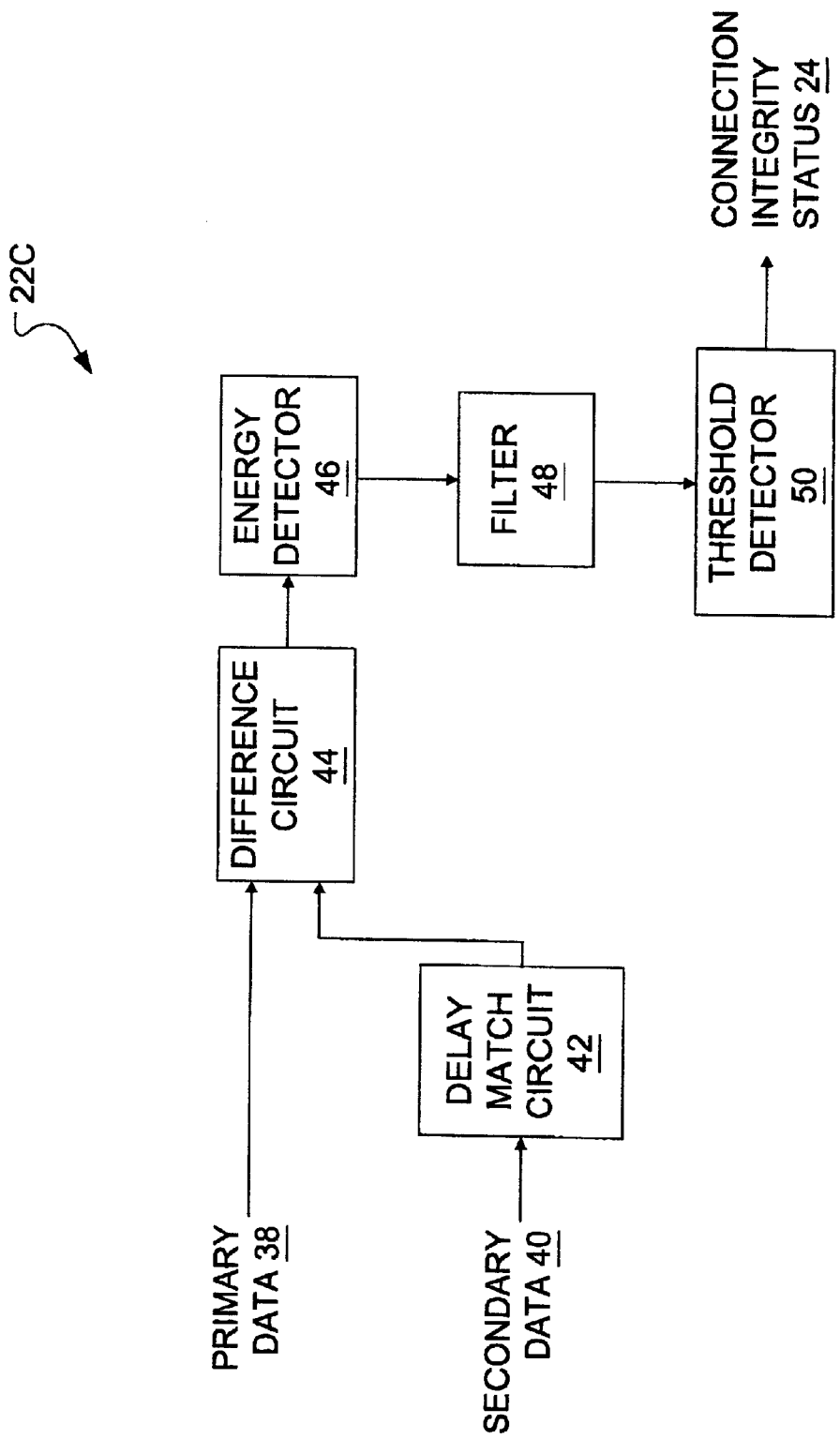
FIG. 4 is a schematic illustration of the comparison circuit of the present invention.

An exemplary comparison circuit 22A is comparison circuit 22C, schematically illustrated in FIG. 4. Circuit 22C compares two selected data streams to determine whether they are the same. A primary data stream 38 will be data on one of the M data output paths 16 and a secondary data stream 40 will be data on a corresponding one of the M data paths output from secondary connection circuit 30. A delay match circuit 42 receives input from stream 40 of secondary data and passes secondary data stream 40 delayed such that it corresponds in time to primary data stream 38. A difference circuit 44 receives primary data stream 38 and output from delay match circuit 42 and passes output to an energy detector 46. A DC detected difference signal at the output of energy detector 46 is filtered by a filter 48 to remove any AC components. The filtered difference signal is passed to a threshold detector 50 that indicates, on one of the connection integrity status lines 24, when the difference signal exceeds an appropriate threshold. Preferably, a high on one of the connection integrity status lines 24 indicates no fault or matched connection, while a low indicates an active fault or unmatched connection. This same arrangement is provided for each of the output paths 16.

The operation of comparison circuit 22C comprises matching the delay of secondary data stream 40 to primary data stream 38, subtracting the two data streams from one another, filtering that difference and comparing the filtered difference to an appropriate threshold. If the energy remaining after filtering is greater than an appropriate threshold, which allows for some residual waveform discrepancy, then the connection integrity status will indicate a failed condition.

Specifically, the actions of comparison circuit 22C are carried out by the following components. Delay match 42 provides a delay equivalent to the offset between primary 38 and secondary 40 data streams. The purpose being to minimise the difference energy caused by misalignment of the signals. Delay matching may not be necessary if similar devices are used for both primary and secondary signal selection. Delay match 42 may consist of a matched delay line, a lumped element delay, a variable delay element (tunable to optimum delay) or one of many other possible circuits known to those skilled in the art. Difference circuit 44 effectively subtracts the two signals from one another. Energy detect circuit 46 converts the difference signal from difference circuit 44 into a DC signal which, after filtering, is proportional to the discrepancy between primary 38 and secondary 40 data streams. Note that the difference and energy detect circuits may be combined into a single function such as a linear mixer or exclusive-OR gate (XOR), each approximating a multiplication. Filter 48 is necessary to remove the AC component of the detected difference signal. The output of filter 48 provides a voltage proportional to the discrepancy between primary 38 and secondary 40 data streams. Threshold detector 50 indicates when the detected DC voltage exceeds an appropriate threshold, Hysteresis may be implemented such that small undulations on the DC voltage do not cause the detected status to oscillate.

Figure 5:
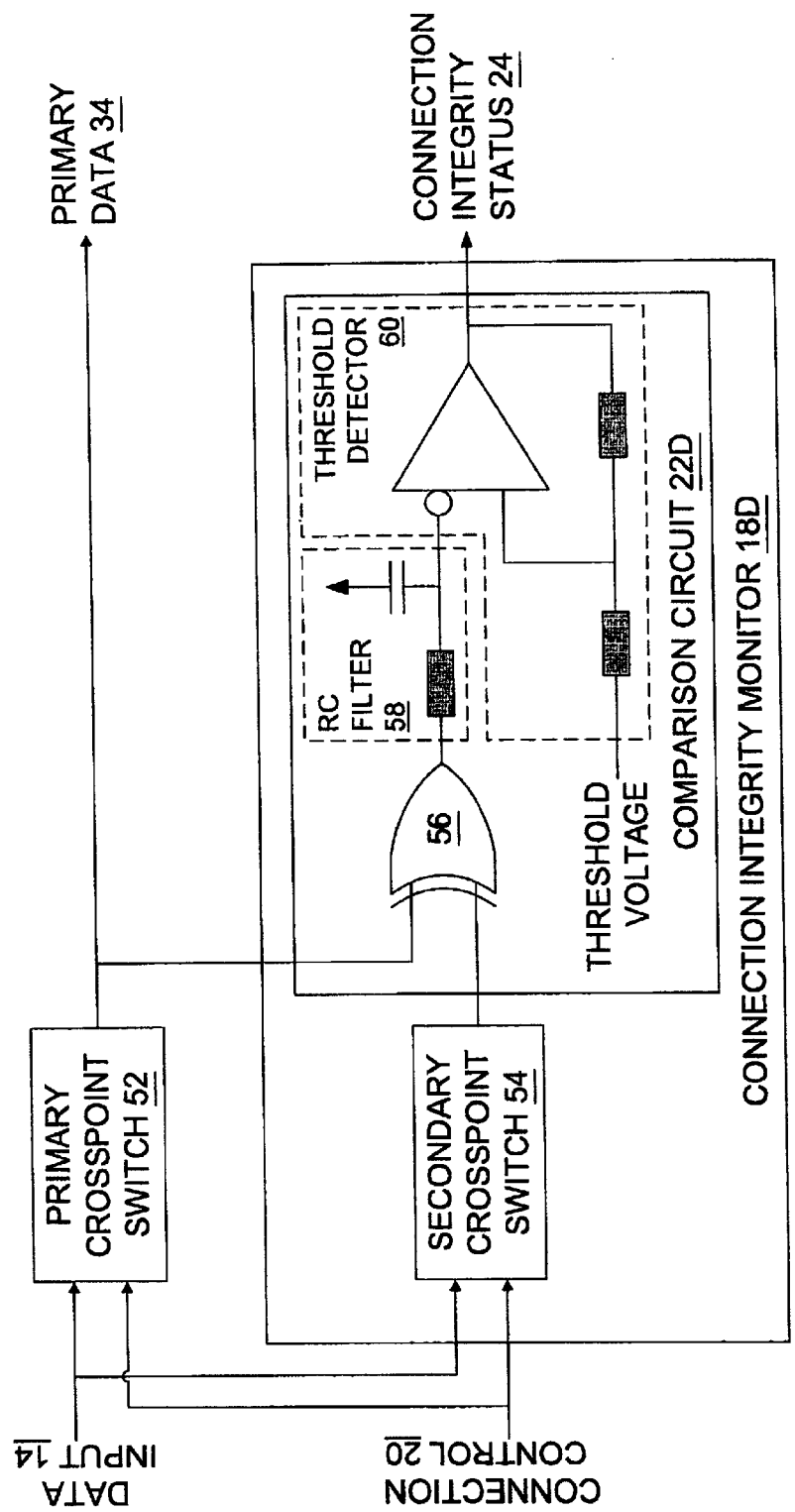
FIG. 5 is a schematic illustration of a circuit incorporating the connection monitor of the present invention.
Figure 6:
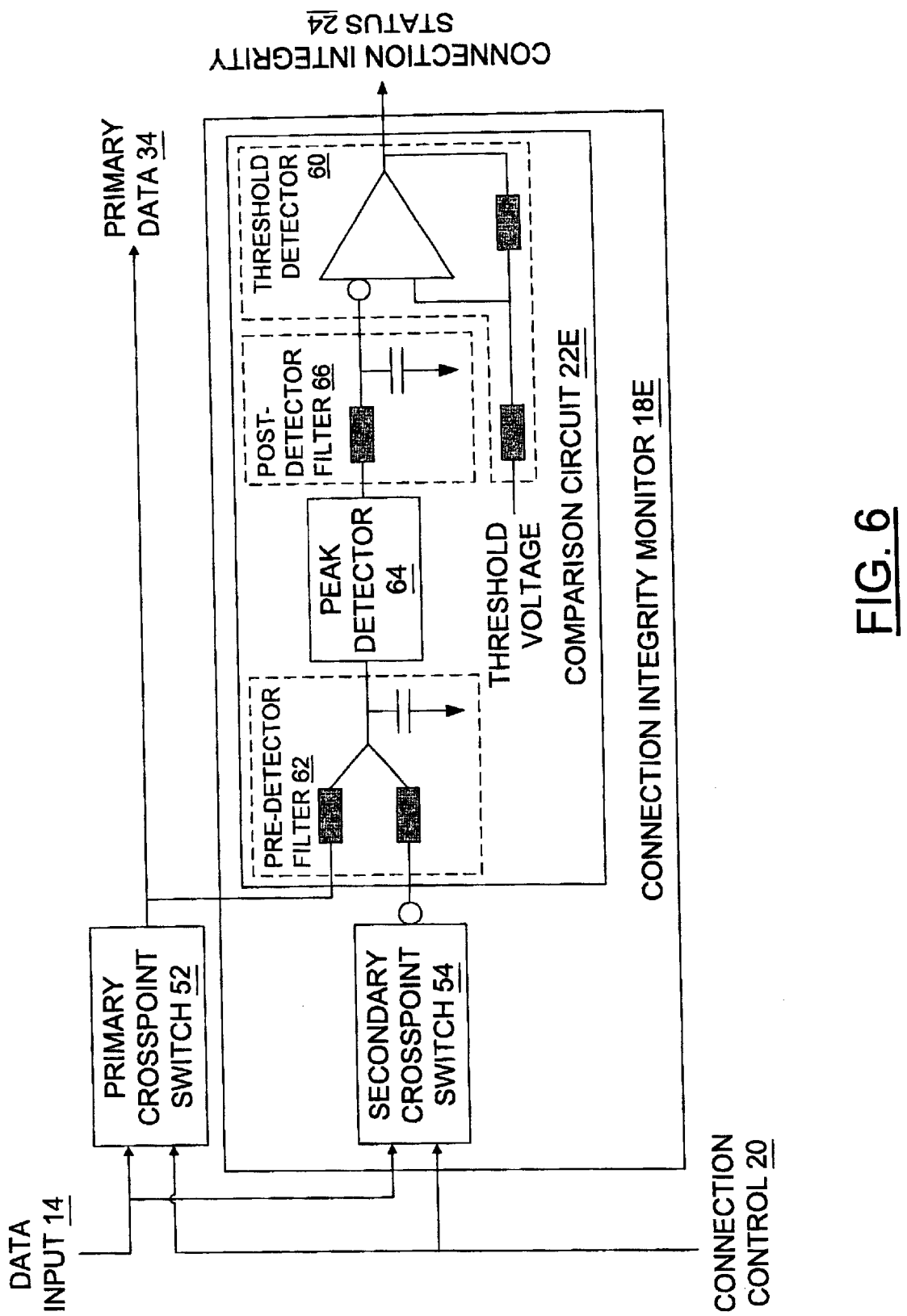
FIG. 6 is a schematic illustration of an alternate embodiment of FIG. 5.

Referring now to FIGS. 5 and 6, shown are implementations of switched circuits where it has been assumed that the delay of the primary and secondary data streams are essentially matched in the comparison circuit of the connection integrity monitor. Note also that a primary crosspoint switch 52 acts in place of primary connection unit 12A of FIG. 2 and a secondary crosspoint switch 54 acts in place of the combination of secondary connection circuit 30 and secondary connection map 32 of FIG. 2. Where primary connection unit 12 (FIG. 1) is a generic device in which several outputs may be selected uniquely from several inputs, primary crosspoint switch 52 (FIG. 5, 6) and the combination of primary connection map 26 and primary connection circuit 28 (FIG. 2) are more specific examples of such a device.

In FIG. 5 a comparison circuit 22D is provided for each data output pate. An XOR circuit 56 receives delay matched signals from both primary 52 and secondary 54 crosspoint switches and passes output to a simple RC filter 58. A threshold detector 60 is used with an input set to a desired threshold level to detect when the output of RC filter 58 exceeds the threshold voltage and report the detection via one of the connection integrity status lines 24.

In comparison circuit 22D of CIM 18D of FIG. 5, XOR circuit 56 provides both subtract (44, FIG. 4) and detect (46, FIG. 4) functions. As is known, if the inputs are equal, the XOR output will be low whereas, if the inputs are not equal, the XOR output will be high. In either case, the XOR output may deviate from predicted levels for brief periods due to subtle signal discrepancies. Thus, if the data streams are the same, the XOR output will be generally low, but if the data streams are different, the likelihood that a single data bit in both streams will be equal is 1/2 and the output of XOR 56 will be in the high and low states for about half the time each. In this embodiment, output of XOR circuit 56 is filtered by a simple RC filter 58 before a threshold detector 60 is used, with one input set to a desired threshold voltage level, to detect when the filtered difference signal exceeds the threshold voltage. Positive feedback is provided with a resistor from output to positive input to provide hysteresis.

FIG. 6 shows a switched circuit similar to FIG. 5 but with another implementation of a comparison circuit 22E. Primary data 34 from primary crosspoint switch 52 is received at a pre-detector filter 62 with inverted output of secondary crosspoint switch 54 using a resistor divider. A peak detector 64, that may be implemented in a variety of ways known to those skilled in the art, receives a signal from pre-detector filter 62 and passes output to a post-detector filter 66. Threshold detector 60 receives output from post-detector filter 66 and generates an indication on one of the connection integrity status lines 24.

In comparison circuit 22E of CIM 18E of FIG. 6, subtraction (44, FIG. 4) is achieved by combining positive output 34 from primary crosspoint switch 52 with the inverted output of the secondary crosspoint switch 54 using a resistor divider incorporated in pre-detector filter 62. Pre-detector filter 62 also serves to remove noise in the subtracted signal due to edge misalignments. The output of peak detector 64 is filtered by post-detector filter 66 and processed by threshold detector 60 to result in an indication on one of the connection integrity status lines 24.

Returning to FIG. 1, a failure indicator, on one of the connection integrity status lines 24, may be implemented in a number of ways. For instance, a failure indicator may be a binary electrical signal on one of M connection integrity status lines 24 corresponding to a particular one of M output paths 16. A register with sticky bits indicating the status of all outputs may be connected to connection integrity status lines 24 of CIM 18. In such a register, a given bit, representative of the status of a particular one of M output paths 16, may be set high when a failure occurs. The given bit may be clearable by a monitoring entity (e.g., a microprocessor, not shown). Further, an interrupt may be set when any of the sticky bits are set. Alternately, a message may be sent to a monitoring entity (e.g., microprocessor) indicating a failed condition and identifying the output on which the failed condition has been detected. Additionally, an LED may be used to indicate history of occurrence.

Figure 3:
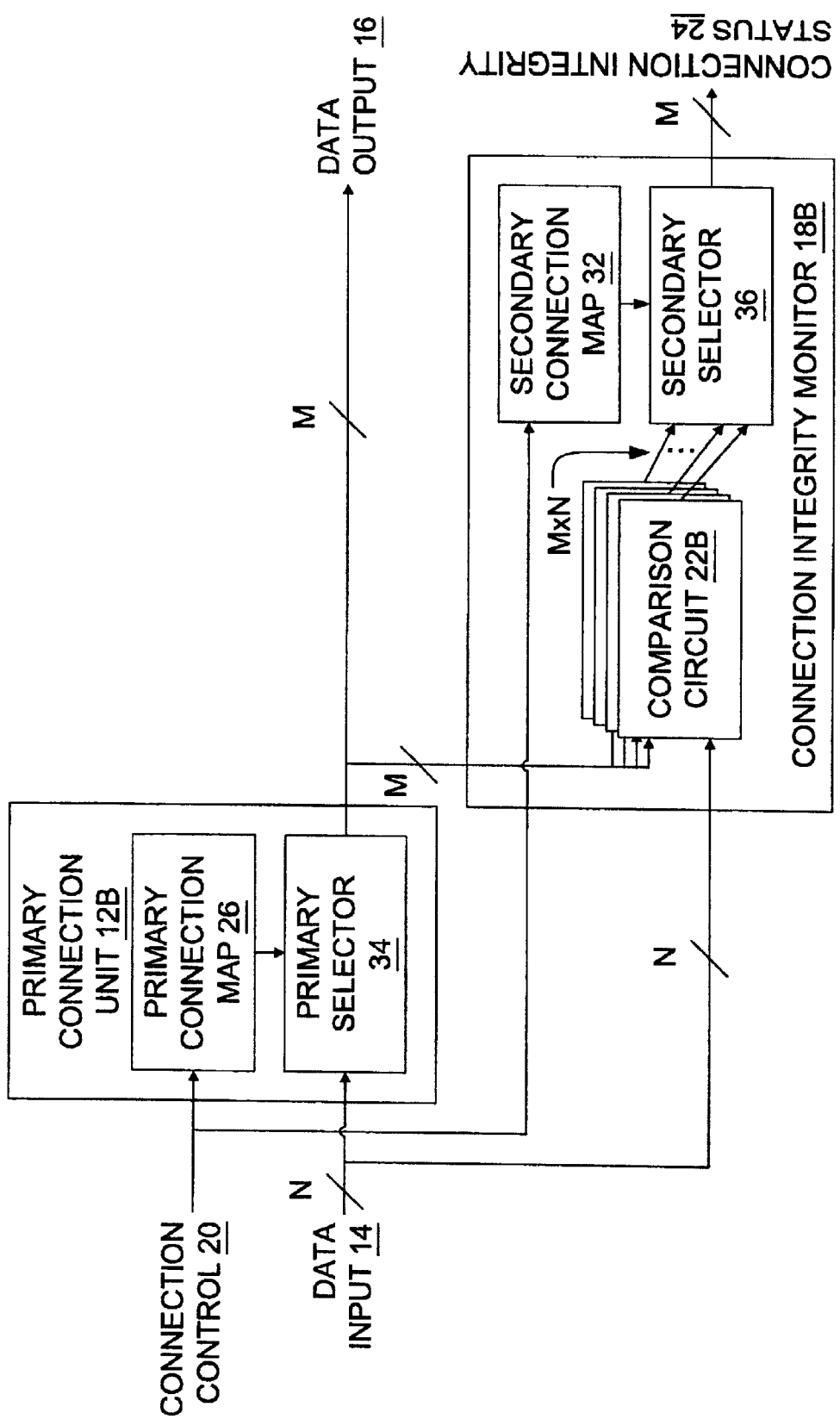
FIG. 3 is an alternative embodiment of the present invention.

In certain applications, an alternate CIM architecture may be used. For each of M output paths 16 in FIG. 3, N comparisons (i.e., one comparison to each of N input paths 14) are made by a comparison circuit 22B. The output of comparison circuit 22B is M×N essentially DC signals. The appropriate signal to output on each of the M connection integrity status lines 24 is then selected by secondary selector 36 from among these M×N signals. This may be an appropriate alternative to the embodiment of FIG. 2 if secondary connection circuit 30 (FIG. 2) is impractical (e.g., too expensive, requiring too much power, etc.) or if comparison circuit 22B is more practical. Secondary connection map 32 contains the connection information to allow secondary selector 36 to select the correct signal, from output of comparison circuit 22B, to output on a connection integrity status line corresponding to a particular one of M output paths 16. Secondary connection map 32 must be completely independent of primary connection map 26 to avoid the same fault occurring in CIM 18B as in the primary connection unit 12B.

With reference to FIG. 1, a connection integrity monitor 18 may indicate a failure in one or more output paths 16 for reasons other than a failure within primary connection unit 12. Failure in an address bus of connection control path 20 may cause a failure indication due to a difference between primary connection map 26 (FIG. 2) and secondary connection map 32 (FIG. 2).

With reference to FIG. 2, one method of confirming connection control path 20 address bus integrity includes maintaining activity on one of data input paths 14 with an input signal which is unique as compared with other possible signals on data input paths 14. For instance, such a unique signal could simply be a toggling or clock signal at a rate different from the possible data rates on data input paths 14. The method further includes writing, to primary connection map 26, a new connection origin for a particular one of M output paths 16, the particular one whose origin had been the input on which activity is maintained with a unique signal. A failure indication, for the particular output path, should then be received from one of the connection integrity status lines 24 of connection integrity monitor 18A. The new connection origin, for the corresponding particular output, may then be written to secondary connection map 32 in connection integrity monitor 18A. Finally, a success indication (or a clearing of the failure indication) for the particular output should be received on the connection integrity status line of connection integrity monitor ISA. If writing a new connection origin to primary connection map 26 does not result in a failure indication, or writing a new connection origin to secondary connection map 32 does not result in a success indication (or a clearing of the failure indication), the integrity of the address bus of connection control path 20 may be suspected.

The above method of confirming address bus integrity may be extended to confirm connection control path 20 data bus integrity. Once a new connection origin has been written to primary connection map 26, the new connection origin may be read back from the primary connection map. The read back new connection origin may then be compared to the written new connection origin (i.e., the new connection origin which was input to the connection control path 20 data bus) and if the read back new connection origin fails to match the written new connection origin, a potential connection control data bus failure may be indicated.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of determining connection fault of an output signal in a data path selector circuit, comprising:

providing a selector circuit having a plurality of data inputs;

providing a second circuit, independent of said selector circuit, for comparing at least one output of said selector circuit with an expected input;

comparing, with said independent circuit, said output with said expected input to determine whether said output is in accordance with said expected input; and detecting, if present, a connection fault.

2. A method of determining connection fault of an output signal in a data path cross-connect circuit, comprising:

providing a cross-connect circuit-having a plurality of data inputs;

providing a second circuit, independent of said cross-connect circuit, for comparing at least one output of said cross-connect circuit with an expected input;

comparing, with said independent circuit, said output with said expected input to determine whether said output is in accordance with said expected input; and detecting, if present, a connection fault.

3. A connection integrity monitor for monitoring connection fault of an output signal in a selector circuit, comprising:

a selector circuit having a plurality of data inputs;

a second circuit, independent of said selector circuit, for comparing at least one output of said selector circuit with an expected input;

a comparison means for comparing said at least one output with said expected input; and a detection means for detecting a connection fault from a comparison of said at least one output with said expected input.

4. A connection integrity monitor for monitoring connection fault of an output signal in a cross-connect circuit, comprising:

a cross-connect circuit having a plurality of data inputs;

a second circuit, independent of said cross-connect circuit, for comparing at least one output of said cross-connect circuit with an expected input;

a comparison means for comparing said at least one output with said expected input; and a detection means for detecting a connection fault from a comparison of said at least one output with said expected input.

5. A method of monitoring a connection unit, said connection unit comprising a primary connection map for receiving connection control signals and a primary connection circuit for receiving input from said primary connection map and for performing primary connections between a plurality of inputs and a plurality of primary outputs, said primary connections based on said connection control signals, said method comprising:

receiving said connection control signals;

receiving said plurality of inputs;

performing secondary connections between said plurality of inputs and a plurality of secondary outputs, said secondary connections based on said connection control signals;

receiving said plurality of primary outputs; and determining a connection integrity status indicator from said plurality of primary outputs and said plurality of secondary outputs.

6. A connection integrity monitor for monitoring a connection unit, said connection unit comprising a primary connection map for receiving connection control signals and a primary connection circuit for receiving input from said primary connection map and for performing primary connections between a plurality of inputs and a plurality of primary outputs, said primary connections based on said connection control signals, said monitor comprising:

a comparison map for receiving said connection control signals;

a secondary connection circuit for:
 receiving said plurality of inputs;
 receiving input from said comparison map; and
 performing secondary connections between said plurality of inputs and a plurality of secondary outputs, said secondary connections based on said connection control signals; and a comparison circuit for:
 receiving each of said primary outputs;
 receiving each of said secondary outputs; and
 determining a connection integrity status indicator from each of said primary outputs and each of said secondary outputs corresponding to each of said primary outputs.

7. The monitor of claim 6 wherein said comparison circuit includes a difference circuit for generating a signal indicative of a difference between one of said primary outputs and one of said secondary outputs corresponding to each of said primary outputs.

8. The monitor of claim 7 wherein said difference circuit comprises an Exclusive OR gate.

9. The monitor of claim 7 wherein said comparison circuit includes a threshold detector for determining whether said difference indicative signal exceeds a threshold.

10. The monitor of claim 7 wherein said comparison circuit comprises a filter for filtering said difference indicative signal.

11. A method of checking integrity of a connection control path connected to a primary connection map of a primary circuit and to a secondary connection map of an integrity monitor, comprising:

a) maintaining activity on one of a plurality of data inputs to said primary circuit and said integrity monitor with an input signal which is unique as compared with other possible signals on said plurality of data inputs;

b) where said connection integrity monitor indicates a no fault connection for a given output of said primary circuit based on a comparison between a data signal on said given output and a corresponding data signal generated by said connection integrity monitor, where a connection origin for said given output is said one of said plurality of data inputs, and where a connection origin for said corresponding data signal is said one of said plurality of data inputs, writing a new connection origin for said given output to said primary connection map;

c) checking for an indication by said connection integrity monitor of a faulty connection for said given output; and d) if said checking of step b) fails to indicate a faulty connection, indicating a potential connection control address bus failure.

12. The method of claim 11 further comprising:

e) writing said new connection origin for said given output to said secondary connection map;

f) checking for an indication by said connection integrity monitor of a no fault connection for said given output; and g) if said checking of step f) fails to indicate a no fault connection, indicating a potential connection control address bus failure.

13. The method of claim 11 further comprising reading back said new connection origin from said primary connection map;

comparing said read back new connection origin to said new connection origin of said writing step; and if said comparing fails to match said read back new connection origin to said new connection origin of said writing step, indicating a potential connection control data bus failure.

14. A method of checking for a connection fault in a switched data path connection circuit, comprising:

providing a fault indicating output path corresponding with each output data path of said switched data path connection circuit and a fault indicating input path corresponding with each input data path of said switched data path connection circuit;

receiving connection control signals for said switched data path connection circuit;

receiving an input data signal at each fault indicating input path corresponding with each data path input of said switched data path connection circuit; and utilising said connection control signals, each said input data signal and each output data signal on said each output data path to check for a connection fault.

15. A method of checking for a connection fault in a switched data path connection circuit, comprising:

providing a fault indicating output path corresponding with each output data path of said switched data path connection circuit and a fault indicating input path corresponding with each input data path of said switched data path connection circuit;

receiving connection control signals for said switched data path connection circuit;

receiving an input data signal at each fault indicating input path corresponding with each data path input of said switched data path connection circuit;

mapping said received data signal on said corresponding fault indicating input path to one said fault indicating output path based on said connection control signals; and comparing a signal on said one said fault indicating output path with a signal on a corresponding output path of said switched data path connection circuit to check for a connection fault.

16. The method of claim 15 wherein said comparing comprises generating a signal indicative of a difference between said signal on said one said fault indicating output path and said signal on a corresponding output path of said switched data path connection circuit.

17. The method of claim 16 further comprising, if said difference indicative signal exceeds a threshold, indicating a connection fault.

18. The method of claim 15 further comprising, before said comparing, matching a delay of said signal on said one said fault indicating output path to a delay of said signal on said corresponding output path of said switched data path connection circuit.

19. A method of checking for a connection fault in a switched data path connection circuit, comprising:

providing a fault indicating output path corresponding with each output data path of said switched data path connection circuit and a fault indicating input path corresponding with each input data path of said switched data path connection circuit;

receiving connection control signals for said switched data path connection circuit;

receiving an input data signal at each fault indicating input path corresponding with each data path input of said switched data path connection circuit;

for said each output data path of said switched data path connection circuit, comparing a signal on said each output data path to each input data signal; and connecting a connection fault indicating signal resulting from said comparing step to one said fault indicating output path based on said connection control signals.

* * * * *